Oct. 17, 1961 D. M. IHLE 3,004,728
OSCILLOGRAPHIC RECORDER
Filed Dec. 1, 1959 3 Sheets-Sheet 1

INVENTOR.
DAN M. IHLE
BY Irving M. Freedman
HIS ATTORNEY

Oct. 17, 1961
D. M. IHLE
3,004,728
OSCILLOGRAPHIC RECORDER
Filed Dec. 1, 1959
3 Sheets-Sheet 2
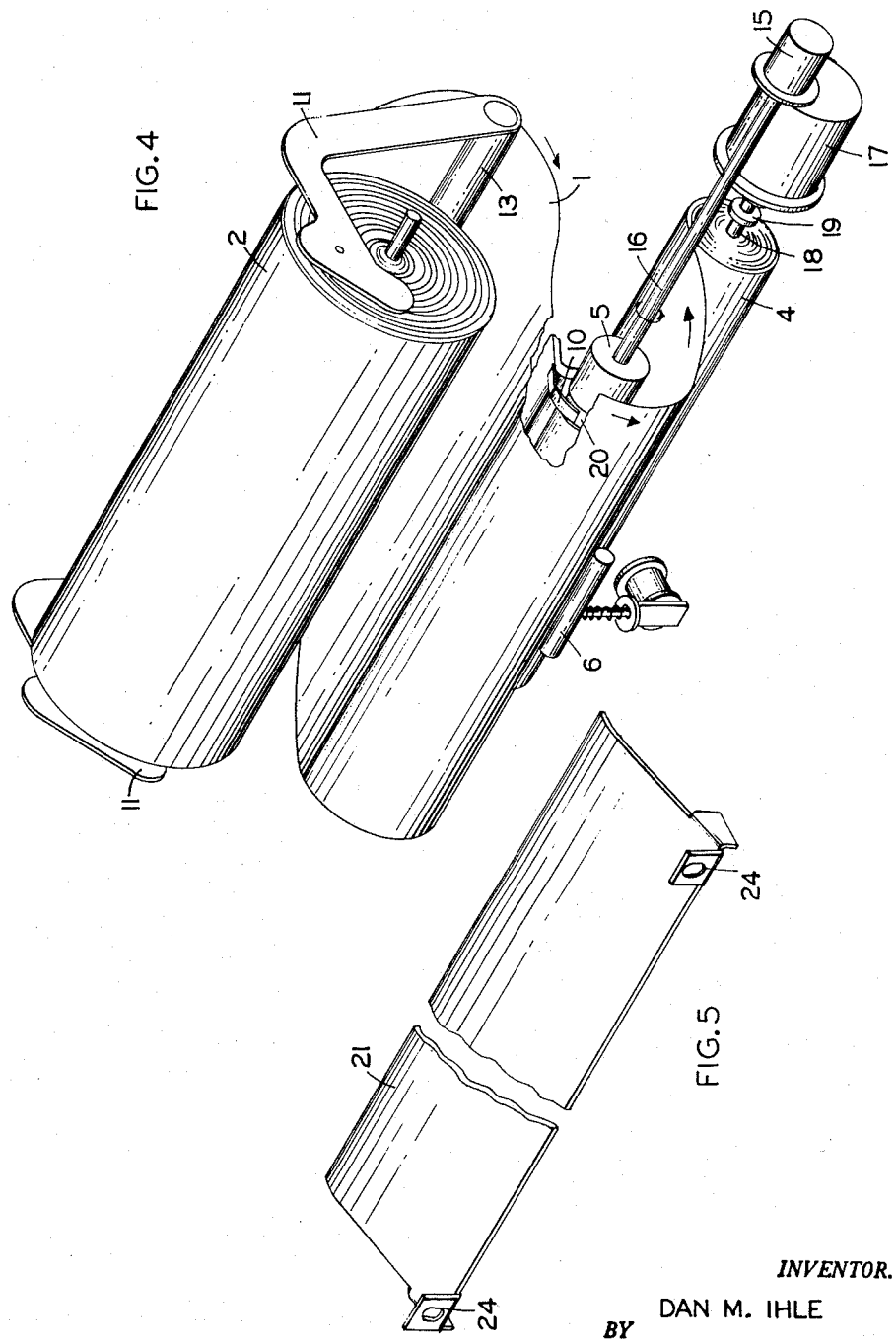
INVENTOR.
DAN M. IHLE
BY
Irving M. Freedman
HIS ATTORNEY Oct. 17, 1961  D. M. IHLE  3,004,728
OSCILLOGRAPHIC RECORDER
Filed Dec. 1, 1959  3 Sheets-Sheet 3

*INVENTOR.*
DAN M. IHLE
BY
*Irving M. Freedman*
HIS ATTORNEY

United States Patent Office 3,004,728
Patented Oct. 17, 1961

3,004,728
OSCILLOGRAPHIC RECORDER
Dan M. Ihle, Lynn, Mass., assignor to General Electric Company, a corporation of New York
Filed Dec. 1, 1959, Ser. No. 856,423
8 Claims. (Cl. 242—55.11)

This invention relates to oscillographic recorders and, more particularly, to improvements in the paper drive mechanism thereof.

In an automatic oscillographic recorder, a photosensitive recording strip is accelerated from standstill to a predetermined rate of travel past a recording point in response to a condition to be recorded. The characteristics of the condition are translated into variations in the amplitude of a beam of light projected to the recording point past which the strip moves. Such recorders are used to record transient conditions and it is necessary to quickly actuate the recording strip, which is usually of a photosensitive paper, from a standstill condition to a full speed condition in order to record abnormal transient conditions which are often of an extremely short duration. Because of the rapid speed at which the paper must be accelerated and moved, it has been found that paper jams within the mechanism cause considerable damage to the recorder. Paper jamming may be caused by improper operator technique, such as not completely spooling the paper, not meshing the drive gears, closing the associated shutter at the wrong time, or because of a malfunction in the paper drive mechanism itself. It has been found that paper jams often result in the paper getting wrapped around the main drive roller causing damage to the delicate shutter mechanism or other mechanisms of the recorder.

It is an object of this invention to provide an improved paper drive mechanism for an oscillographic recorder.

It is a further object of this invention to provide an arrangement to detect paper jams in an oscillographic recorder and discontinue the feeding of the paper to prevent damage to the recorder.

It is a still further object of this invention to provide an arrangement which will stop the rotation of the main paper drive roller of an oscillographic recorder upon the occurrence of a paper jam.

It is another object of this invention to provide an arrangement to detect and indicate a paper jam in an oscillographic recorder.

Other objects and advantages of the present invention will become apparent as the following description proceeds and the features of novelty which characterize the invention will be pointed out with particularity in the claims annexed to and forming a part of this specification.

In accordance with one form of the invention, an arrangement is provided in an oscillographic recorder of the type utilizing a recording strip which is moved between a supply spool and a takeup spool to detect pileup of the strip upon a fault in the strip moving system to stop the movement of the strip in order to prevent damage to the recorder and provide a jam indication. The pileup detection means comprise two loading members which are positioned respectively on either side of the strip in the region between the rotatable drive member which engages and drives the strip and the takeup spool. One of the loading members is resiliently mounted such that it may move in response to the pileup of the strip in the region between the guide members upon the occurrence of a fault in the strip moving system. In a preferred embodiment of the invention, the movement of the guide member is utilized to directly stop the movement of the strip from the supply spool through contact with the rotatable drive member to impose an additional load upon the alternating current electric motor driving the drive member such that the motor will stall.

Means responsive to the change of current flow in the alternating current electric motor upon the stalling thereof may be utilized to actuate a relay to cut off the power to the motor driving the takeup spool and also to indicate the fact that pileup has occurred and the instrument is inoperative.

For a better understanding of this invention, reference may be had to the following description taken in connection with the accompanying drawings in which:

FIG. 4 is an isometric view of the paper drive mechanism shown in FIG. 1;

FIG. 5 is a perspective view of an improved paper guide member useful in practicing the invention;

Figure 1:
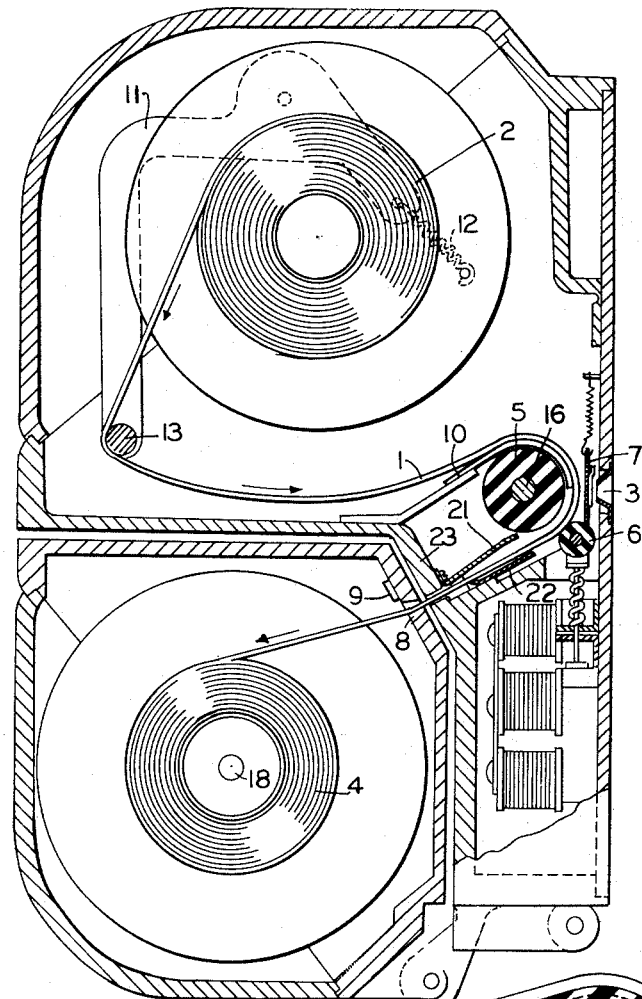
FIG. 1 is a cross sectional view of a portion of an oscillographic recorder incorporating the invention.

Referring to the drawings, particularly FIGS. 1 and 4, it will be seen that the recording paper or strip 1 is fed from the supply spool 2 past the recording aperture 3 to be respooled on the takeup spool 4 with the direction of paper travel being indicated in the drawings by arrows.

Automatic oscillographic recorders are commonly used for monitoring electrical phenomena in a power system where the phenomena may be caused by unforeseeable but not unexpected disturbances such as lightning strokes and grounding of transmission lines. Since the disturbances are not present during comparatively long standby periods, in the interests of economy the recording strip 1 is maintained in a standstill condition and quickly brought up to speed upon the occurrence of a disturbance condition. It is necessary to accelerate the recording strip from standstill to a predetermined rate of travel past the recording aperture 3 in as short a time as possible in order to adequately record the disturbance. One method of insuring rapid acceleration of the recording strip is disclosed in copending patent application, Serial No. 610,025, filed September 14, 1956, in the name of Joseph L. Paine, entitled "Oscillographic Recorder" and assigned to the same assignee as the present application. That application describes an arrangement which may be utilized in the recorder of FIG. 1 wherein the strip 1 is normally out of frictional engagement with a continuously rotating drive member 5. The dynamic inertia of the rotating drive member 5 is utilized to provide quick strip acceleration through a condition responsive mechanism including a retractable roller 6 which presses the recording strip 1 into frictional engagement with the rotating drive member upon the occurrence of a disturbance. Since the drive member is already rotating, it has enough dynamic inertia to quickly bring the recording strip 1 up to the required speed.

A condition responsive shutter mechanism 7 may be interposed between the recording aperture 3 and the recording strip 1 to operate in response to condition responsive means in a manner more fully described in copending application Ser. No. 610,024, filed September 14, 1956, in the names of Hans A. Bakke and Joseph L. Paine, entitled "Oscillographic Recorder" and assigned to the same assignee as the present application. Reference may be had to the above-mentioned patent applications for a more complete discussion of the condition responsive apparatus for actuating the retractable roller 6 and the shutter mechanism 7.

Associated with the supply spool 2 is a slack reserve forming device which includes a pivoted lever 11 biased by spring 12 at one end and including an idler roller 13 around which the recording strip 1 passes at the other end. The slack reserve forming device is more fully described in application Ser. No. 610,003, filed September 14, 1959 in the name of Hans A. Bakke, entitled "Oscillographic Recorder" and now abandoned.

The recording paper 1 passes over arcuate spring member 10 positioned above the drive roller in the region between the idler 13 and the drive roller 5. In the standby condition in which the A.C. motor 15 is energized the spring 10 helps to maintain the recording paper 1 out of contact with the rotating drive roller 5. Upon the occurrence of a condition to be recorded and the respooling of the recording paper 1 through the rotation of the takeup spool 4, tension in the paper 1 presses the spring 10 downward toward the drive member 5. An annular groove 20 in the drive roller 5 provides a recess into which the spring 10 may be depressed without interfering with the rotation of the drive roller.

A shutter 9 is associated with the takeup spool housing to enable the closure of opening 8 through which the strip 1 passes prior to removal of the takeup spool housing from the recorder.

The arrangement described thus far quickly and effectively brings the recording strip 1 up to speed from standstill upon the occurrence of a condition to be recorded. However, it has been found that improper operator techniques such as not completely spooling the paper, not meshing the gears associated with the drive mechanism, closing the shutter 9 at the wrong time, or equipment malfunction, can cause rapid movement of the recording strip 1 through the action of drive member 5 and retractable roller 6 without the correct respooling of the strip on takeup spool 4. Under such conditions, the recording paper strip 1 can get wrapped around the drive member 5 causing a paper jam and pileup with consequent damage to the delicate shutter mechanism 7.

In accordance with the present invention an A.C. or alternating current motor 15 is directly coupled to shaft 16 for rotation of drive member 5 and a D.C. or direct current motor 17 may be coupled to the shaft 18 associated with the takeup spool 4. In the event of a paper jam, the additional load causes the A.C. motor 15 to stall without damage thereto while the D.C. motor 17 continues to respool the paper to tend to eliminate the jam. A slip clutch 19 may be interposed between the D.C. motor 17 and shaft 18 to prevent the stalling and burning out of the D.C. motor if the recording strip jam can not be cleared through the described action.

The arrangement described above has been found to be very effective in preventing paper jams with recording papers .006 inch or thicker. However, recording papers which are as thin as .002 inch and are used to facilitate handling ease and high writing speeds have been found to have insufficient stiffness to stall the A.C. motor 15, and therefore have a tendency to start wrapping around the main drive member or roller 5 upon the occurrence of a fault in the paper transport mechanism.

An uncomplex yet effective mechanism to detect a paper jam and stop the rotation of drive member 5 before serious damage can be caused to the shutter mechanisms 7 or other mechanisms of the oscillograph is provided by the combination light trap and paper guide arrangement shown in FIGS. 1 and 5. Referring to these figures, it will be seen that the recording strip 1 after passing between the drive member 5 and retractable roller 6 passes between a pair of paper guide or loading members 21 and 22, respectively. The upper guide member 21 is located in the region between the lower end of drive member 5 and the recording strip 1 while the lower guide member 22 is located on the opposite side of the recording strip. Member 21 is constructed of resilient material and is secured at the end remote from drive member 5 to the frame 23 associated with the recorder through suitable fastening means 24. A satisfactory material for member 21 has been found to be brass sheet, .032 inch thick.

Figures 2, 3:
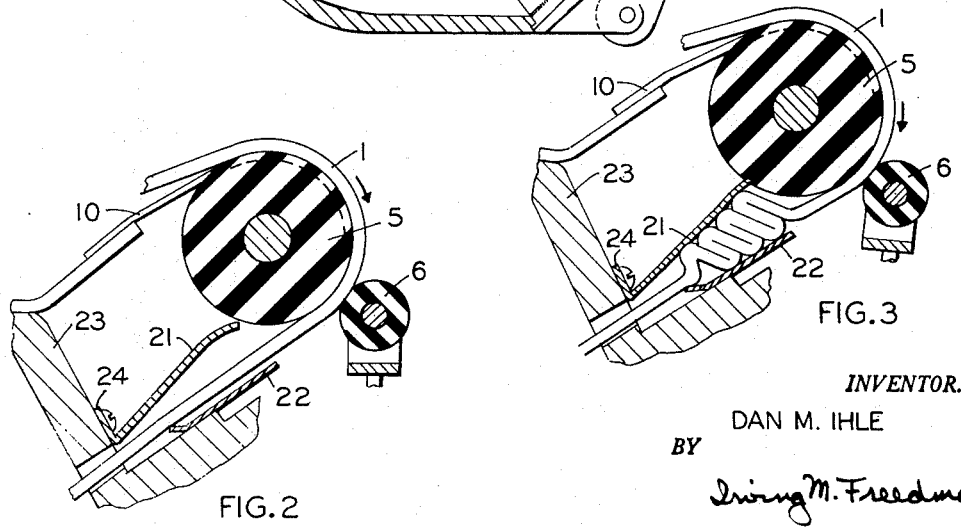
FIGS. 2 and 3 are sectional views illustrating the effect of a paper jam during operation of the oscillographic recorder shown in FIG. 1.

As best illustrated by FIGS. 2 and 3, the recording strip 1 passes between the paper guide or loading members 21 and 22 after passing between the drive roller 5 and retractable roller 6. If for some reason, the recording strip becomes jammed, that is the takeup spool 4 fails to properly respool the paper and draw it from the region of the drive member 5, the drive member will continue to discharge recording paper drawn from the supply spool 2. The paper guide members 21 and 22 will prevent the recording paper from wrapping itself around the drive member 5 in a manner best illustrated by FIG. 3. As shown by that figure, when the takeup spool ceases respooling the recording strip 1 the paper discharged from drive member 5 begins to pile up in layers between the paper guides 21 and 22. Since the respooling motor 17 is not effectively aiding in the movement of the recording paper 1, the A.C. motor 15 may stall because of the additional load placed upon it. If the loading is insufficient to stall the motor 15, the recording paper piling up between the loading members 21 and 22 exceeds the space available therebetween and exerts a force which tends to separate the guide members. Since the member 22 is fairly rigid relative to the resilient member 21, the member 21 moves upwardly to contact the rubber covering of the drive roller 5. The pressure exerted by the paper pileup between the members 21 and 22 will continue to increase until sufficient pressure is exerted by guide member 21 against the drive roller 5 to stall the motor 15.

Once the A.C. motor 15 is stalled, the driving of the recording paper 1 from the supply spool 2 ceases and damage to the instrument mechanism, particularly the shutter mechanism 7, is prevented.

To place the recorder back in normal operation, it is only necessary to turn the recorder power off, correct the malfunction which caused the paper jam, and draw out the recording paper piled up between the paper guide members 21 and 22.

It is to be noted that in the event of paper pileup, the D.C. motor 17 will cease respooling the paper 1 to prevent the tearing of the recording paper if the torque thereon becomes excessive through the action of the slip clutch 19.

Figure 6:
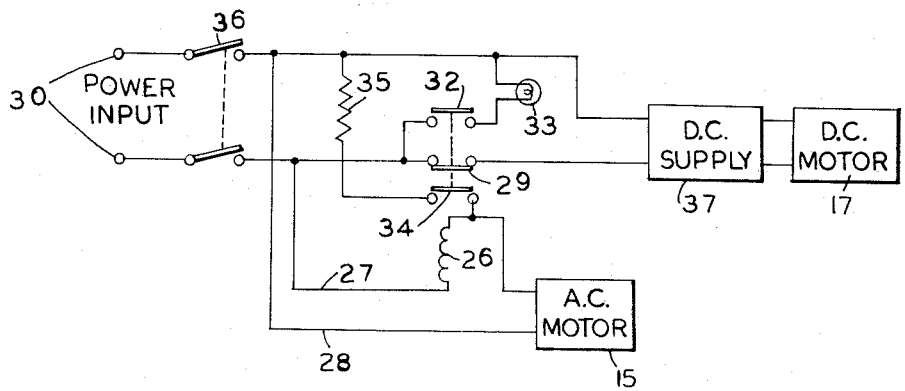
FIG. 6 is a schematic view of a circuit incorporating the invention and including provisions for indicating a paper jam and de-energizing the motor associated with the takeup spools.

Since the current drawn by an alternating current motor upon being stalled increases, a current responsive relay 26 may be connected in series with the power input lines 27 and 28 of the motor as shown in FIG. 6 to be actuated by the change in current upon motor 15 becoming stalled. The normally closed contactor 29 of relay 26 is connected in series with the recorder power input lines 30 to disconnect the power input to the D.C. supply 37 which powers the D.C. motor 17 upon stalling of the A.C. motor. Associated with the relay 26 is a normally open contactor 32 in series with indicator lamp 33 across the input line 30 to indicate when the A.C. motor 15 has stalled. Normally open contactor 34 connected in series with current limiting resistor 35 are connected across the power input lines 30 to maintain relay 26 in the energized position upon actuation of relay 26.

Upon occurrence of a paper jam, A.C. motor 15 stalls, energizing relay 26 which in turn energizes indicator lamp 33, cuts off the power to the D.C. motor 17 and holds itself in through the holding contactor 34. To reset the equipment, it is only necessary to disconnect the power input by opening switch 36 and the recorder may then be energized by closing switch 36 to be again placed in normal operating condition.

Figure 7:
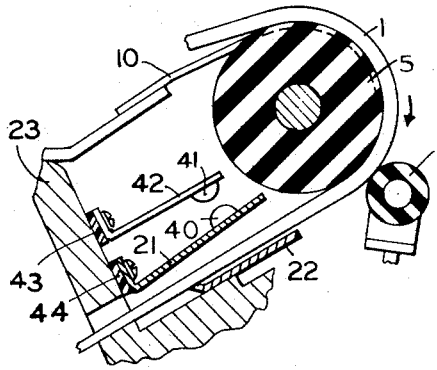
FIGS. 7 and 8 are sectional views illustrating an alternate embodiment of the invention in which the paper jam detection mechanism directly operates electrical switch contacts in circuit with the paper mechanism drive motors.
Figure 8:
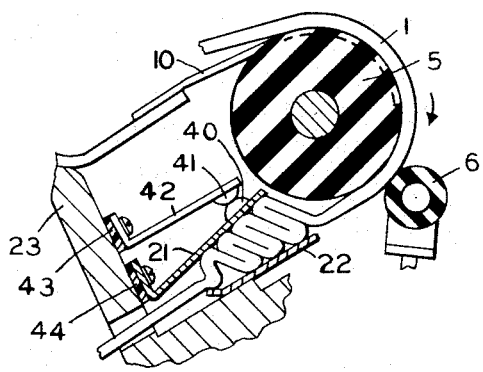

Instead of utilizing the movement of the paper guide member 21 in response to a paper jam as an additional load on the A.C. motor 15 to stall the motor, a switch contact carried by the guide or load member 21 cooperating with a stationary contact may be utilized to control the energization of the motors 15 and/or 17. Such an arrangement is shown by FIGS. 7 and 8. Referring to these figures, it will be seen that the member 21 has been modified to carry an electrical contact 40 at the free end thereof. Under normal conditions, illustrated by FIG. 7, the contact 40 is separated from the fixed electrical contact 41 carried by blade 42 and secured to, but separated from, frame 23 by electrically insulating member 43. Insulating member 44 may be interposed between the guide member 21 and the frame 23.

As illustrated by FIG. 8, and in a manner similar to that described with reference to FIGS. 2 and 3, the guide member 21 will move upwardly upon the occurrence of a paper jam in the region between the guide members 21 and 22 and the electrical contact 40 will complete an electrical circuit through contact 41. The electrical circuit thus completed may be utilized to energize a relay such as 26, cut off the supply to the motor 17 and/or the motor 15 and actuate an indicating lamp or other warning device such as a lamp 33 described in regard to the circuit of FIG. 6. Instead of cutting off the power to the motor 17 and/or the motor 15, electric clutches may be connected in series with the output shafts of the motors to be actuated to disconnect the motors from their respective loads upon the occurrence of a paper jam.

Figure 9:
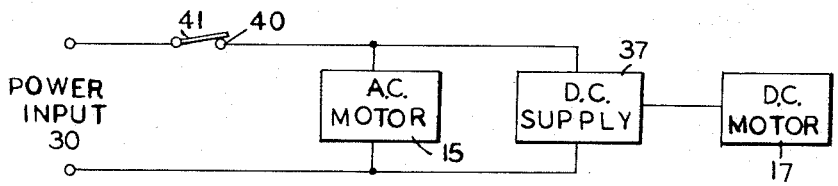
FIG. 9 is a schematic view of an energizing circuit for the drive motors which may be utilized in conjunction with the type of embodiment shown in FIGS. 7 and 8.

Also, instead of utilizing a set of normally open contacts associated with the guide members 21 and 22, a set of normally closed contacts may be substituted which would open upon the movement of paper guide 21 away from guide member 22. The electrical contacts would extend from the sides of members 21 and 42, beyond the strip 1 passing between the members. The contacts may be connected in series with the electrical input to motors 15 and/or 17 to de-energize the motors upon the occurrence of a paper jam. Such an electrical circuit is indicated schematically by FIG. 9. FIG. 9 shows the contacts 40 and 41 in series with the power to the motor 15 and the D.C. supply 37 which powers D.C. motor 17.

If the D.C. supply 37 includes a battery charged periodically by a rectifier, the contactor 29 of FIG. 6 should be placed intermediate the D.C. supply and the motor 10. Similarly, in the arrangement of FIG. 9, the circuit between the D.C. supply and the motor would have to be opened upon a paper jam. This may readily be accomplished by an additional contactor placed between the D.C. supply and the motor.

It may thus be seen that a fail-safe recording paper transport mechanism has been provided which will stop the movement of paper from the supply spool 2 in the event of a paper jam and/or disconnect the power which drives the takeup spool 4 before damage can be done to the delicate shutter mechanism or other mechanisms of the recorder.

Therefore, while particular embodiments of the subject invention have been shown and described herein, they are in the nature of description rather than limitation, and it will occure to those skilled in the art that various changes, modifications, and combinations may be made within the province of the appended claims without departing either in spirit or scope from the invention in its broader aspects.

What I claim as new and desire to secure by Letters Patent of the United States is:

1. For use in an oscillographic recorder having a motive system for moving a recording strip between a supply spool and a takeup spool, an arrangement for stopping the movement of the strip from the supply spool upon the occurrence of a fault in the motive system comprising: a rotatable drive member positioned intermediate the supply and takeup spools for engaging and driving the strip, means to rotate said drive member, and first and second loading members positioned on opposite sides, respectively, of said strip adjacent to said drive member, one of said loading members being normally disposed out of contact with said drive member, said one loading member being movable relative to said drive member in response to the pileup of said strip in the region between said loading members upon a fault in said strip moving system, and said means to rotate said drive member being of sufficiently low torque as to be unable to overcome the frictional load imposed upon said drive member by contact with said one loading member.

2. For use in an oscillographic recorder having a motive system for moving a recording strip between a supply spool and a takeup spool, an arrangement for stopping the movement of the strip from the supply spool upon the occurrence of a fault in the motive system comprising: a rotatable drive member positioned intermediate the supply and takeup spools for engaging and driving the strip, an alternating current motor connected to rotate said drive member, and first and second loading members positioned on opposite sides, respectively, of said strip adjacent to said drive member, one of said loading members being resiliently mounted and normally disposed out of contact with said drive member, said one loading member being movable relative to said drive member in response to the pileup of said strip in the region between said loading members upon a fault in said strip moving system, and said alternating current motor being of sufficiently low torque as to be unable to overcome the frictional load imposed upon said drive member by contact with said one loading member.

3. For use in an oscillographic recorder having a motive system for moving a recording strip between a supply spool and a takeup spool, an arrangement for stopping the movement of the strip from the supply spool upon the occurrence of a fault in the motive system comprising: a rotatable drive member positioned intermediate the supply and takeup spools for engaging and driving the strip, an alternating current motor connected to rotate said drive member, a coupling, a drive motor coupled through said coupling to said takeup spool for the rotation thereof, said coupling adapted to slip at a predetermined torque on said motor, and first and second loading members positioned on opposite sides, respectively, of said strip adjacent to said drive member, one of said loading members being resiliently mounted and normally disposed out of contact with said drive member, said one loading member being movable relative to said drive member in response to the pileup of said strip in the region between said loading members upon a fault in said strip moving system, and said alternating current motor being of sufficiently low torque as to be unable to overcome the frictional load imposed upon said drive member by contact with said one loading member.

4. For use in an oscillographic recorder having a motive system for moving a recording strip between a supply spool and a takeup spool, an arrangement for stopping the movement of the strip from the supply spool upon the occurrence of a fault in the motive system comprising: a rotatable drive member positioned intermediate the supply and takeup spools for engaging and driving the strip, a first motor connected to rotate said drive member, a drive motor coupled to said takeup spool for the rotation thereof, first and second loading members positioned on opposite sides, respectively, of said strip adjacent to said drive member, one of said loading members being normally disposed out of contact with said drive member, said one loading member being movable relative to said drive member in response to the pileup of said strip in the region between said loading members upon a fault in said strip moving system, and said first motor being of sufficiently low torque as to be unable to overcome the frictional load imposed upon said drive member by contact with said one loading member, and means responsive to the stalling of said alternating current motor for de-energizing both of said motors.

5. For use in an oscillographic recorder having a motive system for moving a recording strip between a supply spool and a takeup spool, an arrangement for stopping the movement of the strip upon the occurrence of a fault in the motive system comprising: a rotatable drive member positioned intermediate the supply and takeup spools for engaging and driving the strip, means to rotate said drive member, and first and second loading members positioned on opposite sides, respectively, of said strip, said loading members being intermediate said drive member and said takeup spool, one of said loading members being constructed of resilient material fixedly supported at one end with the other end normally disposed out of contact with said drive member, said other end of said loading member being movable toward said drive member in response to the pileup of said strip in the region between said loading members upon a fault in said strip moving system, and said means to rotate said drive member being of sufficiently low torque as to be unable to overcome the frictional load imposed upon said drive member by contact with said one loading member.

6. For use in an oscillographic recorder having a motive system for moving a recording strip between a supply spool and a takeup spool, an arrangement for stopping the movement of the strip upon the occurrence of a fault in the motive system comprising: a rotatable drive member positioned intermediate the supply and takeup spools for engaging and driving the strip, electric motor means adapted to rotate said drive member and said takeup spool, and first and second loading members positioned on opposite sides, respectively, of said strip adjacent to said drive member, said loading members being planar and substantially parallel to one another to provide strip guide means therebetween, one of said loading members being constructed of resilient material fixedly supported by support means in a region remote from where the strip enters between said loading members, said resilient loading member being deflected about said support means in response to the pileup of layers of said strip in the region between said loading members upon a fault in said strip moving system, said pileup filling the space between the loading members and forcing said resilient member away from said other loading member, and means responsive to the relative movement of said loading members for de-energizing said electric motor means.

7. For use in an oscillographic recorder having a motive system for moving a recording strip between a supply spool and a takeup spool, an arrangement for stopping the movement of the strip upon the occurrence of a fault in the motive system comprising: a rotatable drive member positioned intermediate the supply and takeup spools for engaging and driving the strip, electric motor means adapted to rotate said drive member and said takeup spool, and first and second loading members positioned on opposite sides, respectively, of said strip adjacent to said drive member, said loading members being planar and substantially parallel to one another to provide strip guide means therebetween, one of said loading members being constructed of resilient material fixedly supported by support means in a region remote from where the strip enters between said loading members, said resilient loading member being deflected about said support means in response to the pileup of layers of said strip in the region between said loading members upon a fault in said strip moving system, said pileup filling the space between the loading members and forcing said resilient member away from said other loading member, and means responsive to the movement of said loading members for de-energizing said electric motor means, said responsive means including switch contacts at least one of which is carried by said movable loading members.

8. For use in an oscillographic recorder having a motive system for moving a recording strip between a supply spool and takeup spool, an arrangement for stopping the movement of the strip upon the occurrence of a fault in the motive system comprising: means powered by an electric motor for driving said strip, and first and second loading members positioned on opposite sides, respectively, of said strip, said loading members being located intermediate the supply and takeup spools, said loading members being planar and substantially parallel to one another to provide strip guide means therebetween, one of said loading members being resiliently mounted and movable relative to the other loading member in response to the pileup of layers of said strip in the region between said loading members upon a fault in said strip driving system, said pileup filling the space between the loading members and forcing said resilient member away from said other loading member, and means responsive to the relative movement of said loading member for stopping said electric motor.

References Cited in the file of this patent
UNITED STATES PATENTS

| | | |
|---|---|---|
| 1,946,875 | Nicholson | Feb. 13, 1934 |
| 2,929,571 | Baranowski et al. | Mar. 22, 1960 |